US009586310B2

(12) United States Patent
Sapper et al.

(10) Patent No.: US 9,586,310 B2
(45) Date of Patent: Mar. 7, 2017

(54) TOOL DEVICE FOR THE CONNECTION OF A PLASTIC PIPE OR OF A COMPOSITE METAL/PLASTIC PIPE TO A FITTING BY WAY OF A SLIDING SLEEVE OR COMPRESSION SLEEVE

(71) Applicant: Rehau AG + Co, Rehau (DE)

(72) Inventors: Richard Sapper, Schwabach (DE); Sven Christoph, Neuenbürg (DE); Daniel Wolter, Dürmentingen (DE)

(73) Assignee: REHAU AG + CO, Rehau (DE)

( * ) Notice: Subject to any disclaimer, the term of this patent is extended or adjusted under 35 U.S.C. 154(b) by 0 days.

(21) Appl. No.: 14/732,898

(22) PCT Filed: Nov. 26, 2013

(86) PCT No.: PCT/EP2013/003556
§ 371 (c)(1),
(2) Date: Jun. 8, 2015

(87) PCT Pub. No.: WO2014/086464
PCT Pub. Date: Jun. 12, 2014

(65) Prior Publication Data

US 2015/0336250 A1 Nov. 26, 2015

(30) Foreign Application Priority Data

Dec. 7, 2012 (DE) .................... 20 2012 104 763 U

(51) Int. Cl.
*B23P 19/027* (2006.01)
*B25B 27/10* (2006.01)

(52) U.S. Cl.
CPC ......... *B25B 27/10* (2013.01); *Y10T 29/49941* (2015.01); *Y10T 29/5367* (2015.01)

(58) Field of Classification Search
CPC ..... B25B 27/10; B25B 27/0028; B25B 27/24; B25B 21/00
See application file for complete search history.

(56) References Cited

U.S. PATENT DOCUMENTS 3,849,858 A * 11/1974 Whitledge ........... B21D 39/046
29/237
6,061,894 A * 5/2000 MacLeod ............. H02K 15/028
29/281.3

(Continued)

FOREIGN PATENT DOCUMENTS

EP 1 055 488 A2 11/2000
WO WO 2010/040812 A1 4/2010

*Primary Examiner* — Lee D Wilson
(74) *Attorney, Agent, or Firm* — Da Vinci Partners LLC; John Moetteli

(57) ABSTRACT

A tool device for connecting a plastic pipe or composite metal/plastic pipe to a fitting using a sliding sleeve or compression sleeve. The device includes a housing; a flaring device for flaring the ends of the plastic pipe or composite metal/plastic, pipe; a sliding device for sliding the sliding sleeve on or a pressing device for pressing the compression sleeve on; and a mechanically operable drive element. The drive element can be switched to drive the flaring device or to drive the sliding device or pressing device. The flaring device includes a first piston-cylinder unit, whose working piston has a piston axis and which has an inner end and an end oriented away from the tool device. The sliding device or pressing device includes a second piston-cylinder unit, whose working piston has a second piston axis and which has an inner end and an end oriented away from the tool device.

10 Claims, 3 Drawing Sheets

(56) References Cited

U.S. PATENT DOCUMENTS

| | | | | |
|---|---|---|---|---|
| 2015/0258598 | A1* | 9/2015 | Frenken | B21D 39/20 72/370.08 |
| 2015/0336250 | A1* | 11/2015 | Sapper | B25B 27/10 29/523 |

* cited by examiner

TOOL DEVICE FOR THE CONNECTION OF A PLASTIC PIPE OR OF A COMPOSITE METAL/PLASTIC PIPE TO A FITTING BY WAY OF A SLIDING SLEEVE OR COMPRESSION SLEEVE

CROSS REFERENCE TO RELATED APPLICATIONS

This application is the National Stage of International Application No. PCT/EP2013/003556, filed Nov. 26, 2013, which claims benefit under 35 USC §119(a), to German patent application Ser. No. 20 2012 104 763.2, filed Dec. 7, 2012.

The present invention relates to a tool device for connecting a plastic pipe or a composite metal/plastic pipe to a fitting by means of a sliding sleeve or compression sleeve, which device includes a housing, a flaring device for flaring the ends of the plastic pipe or composite metal/plastic pipe, a sliding device for sliding the sliding sleeve on or a pressing device for pressing the compression sleeve on, and a mechanically operable drive element that can be actuated in a switchable manner in order to drive the flaring device or to drive the sliding or pressing device.

A tool device of this kind is known from DE 10 2008 051 284 B3. In the device described therein, the drive element has only one working piston, which by means of a switch device, can be selectively moved in two diametrically opposed movement directions in order to drive a flaring device on the one hand or a sliding or pressing device on the other.

This tool device, however, has the disadvantage that the flaring device on the one hand and the sliding or pressing device on the other are situated directly one behind the other in the tool device. As a result of this, the described tool device requires a large amount of space. If there is only a small amount of space available when connecting a pipe to a fitting using such a tool, then this space may no longer be sufficient to allow the use of such a tool. In the operation of such a tool device, this arrangement also adds to the travel distance required in order to operate the flaring device and the sliding or pressing device. It is time-consuming to switch between the two operating modes because it is necessary to move through the entire travel distance.

Correspondingly, the object of the present invention is to provide a tool device for connecting a plastic pipe or a composite metal plastic pipe to a fitting by means of a sliding sleeve or compression sleeve, which overcomes the disadvantages of the prior art, in particular, the tool device according to the invention should be usable in cramped conditions. In addition, it should be possible to use the tool device according to the invention in a time-saving way in the individual application. The present invention also includes the use of such a tool device for connecting a plastic pipe or a composite metal/plastic pipe to a fitting by means of a sliding sleeve or compression sleeve.

These and other objects are attained by means of a tool device according to claim 1 and the use according to claim 3. Preferred embodiments of the present invention are described in the claims respectively dependent thereon.

The present invention is based on the discovery that the overall size of such a tool device can be significantly reduced if the flaring device on the one hand and the sliding or pressing device on the other each have a respective piston/cylinder unit and the piston axes of these units are in fact arranged parallel to each other, but their ends overlap each other. This provides a more compact design of the tool device according to the invention, in addition, the use of two separate piston/cylinder units of this kind makes it possible to switch between operation of one and the other by means of a mechanically operable drive element. When changing the operating mode of the tool device, the respective piston does not first have to be moved back into its starting position. In other words, it is not necessary to travel through the entire travel distance of the tool device. This saves a significant amount of time when connecting a pipe end to a fitting.

Correspondingly, the present invention relates to providing a tool device for connecting a plastic pipe or a composite metal/plastic pipe to a fitting by means of a sliding sleeve or compression sleeve, which device includes a housing, an exertion device [misspelling: should he flaring device] for flaring the ends of the plastic pipe or composite metal/plastic pipe, a sliding device for sliding the sliding sleeve on or a pressing device for pressing the compression sleeve on, and a mechanically operable drive element that can be actuated in a switchable manner in order to drive the flaring device or to drive the sliding or pressing device, wherein the flaring device includes a first piston-cylinder unit whose working piston has a piston axis and which has an inner end and an end oriented away from the tool device, and the sliding device or pressing device includes a second piston-cylinder unit, whose working piston has a second piston axis and which has an inner end and an end oriented away from the tool device; the piston axes extend parallel to each other; a perpendicular projection of the inner end of the flaring device onto the piston axis of the sliding device or pressing device lies between the inner end of the sliding device or pressing device and the end oriented away from the tool device; and/or a perpendicular projection of the inner end of the sliding device or pressing device onto the piston axis of the flaring device lies between the inner end of the flaring device and the end oriented away from the tool device.

With regard to the tool device according to the invention, it can turn out to be helpful if the two piston/cylinder units have different cylinder diameters. It is thus possible for the effort that is required to operate the flaring device on the one hand and the sliding or pressing device on the other to be specifically adjusted through the selection of the cylinder diameter of the respective piston/cylinder unit. In this regard, it has in practice turned out to be particularly advantageous if the piston/cylinder unit of the flaring device has a smaller cylinder diameter than the piston/cylinder unit of the sliding or pressing device.

The movement of the drive element in this case can preferably occur in translation or in rotary fashion. When actuating a corresponding actuating element (for example a switch or the like), it is possible to operate either the flaring device or the sliding or pressing device, depending on the setting of the switch.

The drive element is preferably operated in translation, in a mechanical fashion. The mechanical movement of the drive element here is preferably produced hydraulically. The hydraulic unit required for this can be connected to the tool device according to the invention, for example by being screwed or snapped to it. In addition, the tool device according to the invention preferably includes a switch element that makes it possible to select the operating mode of the tool device according to the invention. In a first position of the switch element, the driving force generated by the hydraulic unit is used to drive the piston/cylinder unit of the flaring device. In this case, the piston of this piston/cylinder unit is used to flare one end of the plastic pipe or composite metal/plastic pipe. In a second position of the switch element, the driving force generated by the hydraulic unit is used to drive the piston/cylinder unit of the sliding or pressing device.

The present invention also relates to the use of the tool device according to the invention for connecting a plastic, pipe or composite metal/plastic pipe to a fitting by means of a sliding sleeve or compression sleeve.

The present invention will be explained in detail below with reference to the embodiment shown in the figures. In this case, the present invention will be explained in detail with reference to a tool device according to the invention for connecting pipes to a fitting by means of a compression sleeve. It is understood, however, that the present invention is likewise also suitable for the use of a tool device for connecting a pipe to a fitting by means of a compression sleeve through the use of a corresponding pressing device.

Figure 1:
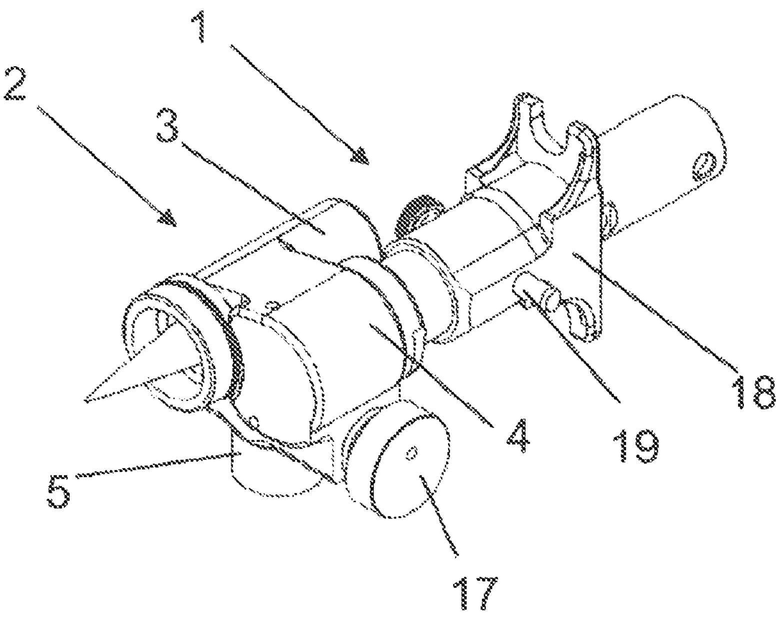
FIG. 1 is a perspective view of a tool device according to an embodiment of the present invention, with a press-fitting yoke.

The figures show an embodiment of a tool device 1 according to the invention for connecting a plastic pipe or composite metal/plastic pipe to a fitting by means of a sliding sleeve or compression sleeve. The tool device 1 according to the invention includes a housing 2, a flaring device 3 for flaring the ends of the plastic pipe or composite metal/plastic pipe, a sliding device 4 for sliding the sliding sleeve on, and a mechanically operable drive element 5. The mechanically operable drive element 5 can be switched by means of a switch device 17 in order to drive the flaring device 3 in a first position of the switch device 17 or to drive the sliding device 4. By means of the switch device 17, the tool device 1 according to the invention is thus equipped to selectively operate either the flaring device 3 in order to flare the ends of a plastic pipe or a composite metal/plastic pipe or to operate the sliding device 4 in order to slide on the sliding sleeve. A slide element 18 is fastened to the sliding device 4 by means of a fastening pin 19. Sliding elements 18 of this kind are known, for example, from DE 20 2008 010 080 U1, whose disclosure content with regard to the design and function of slide elements is included herein by reference.

Figure 2:
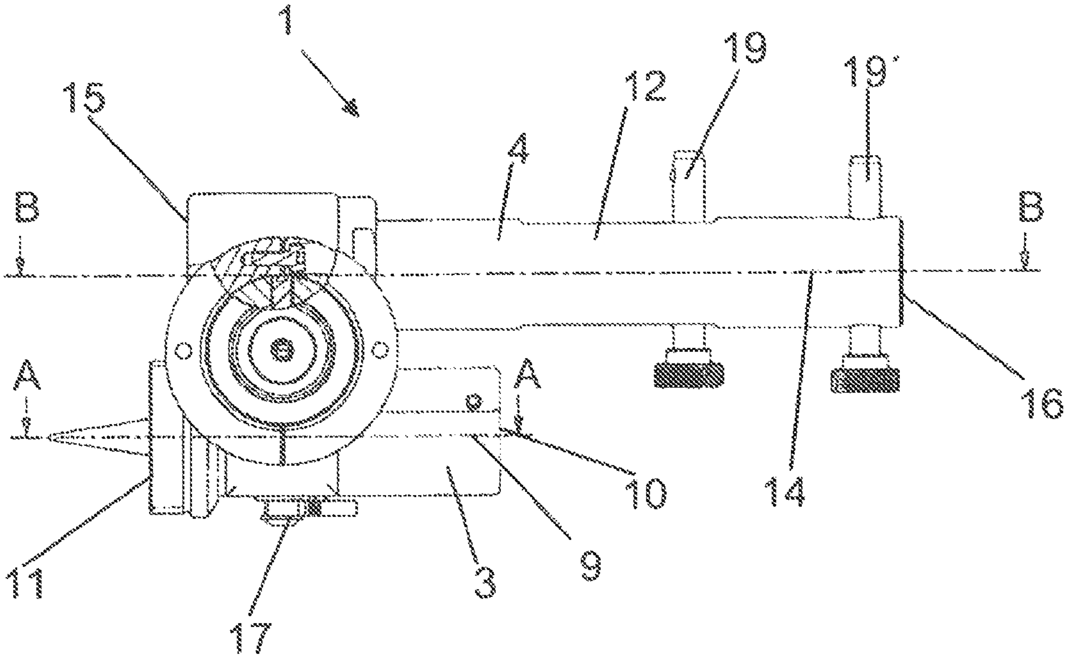
FIG. 2 is a side view of the embodiment shown in FIG. 1, without the press-fitting yoke.

FIG. 2 is a side view of the embodiment of the tool device 1 according to the invention shown in FIG. 1 from which the slide element 18 has been removed. The drawing clearly shows the flaring device 3 with the associated first piston/cylinder unit 6, which has a piston axis 9 as well as an inner end 10 and an end 11 oriented away from the tool device 1 (FIG. 3).

The sliding device 4 likewise includes a second piston/cylinder unit 12. This unit has a working piston 13 with a second piston axis 14 as well as an inner end 15 and an end 16 oriented away from the tool device 1 (FIG. 4).

The two piston axes 9, 14 extend parallel to each other, but do not coincide with each other. In addition, the two piston/cylinder units 6, 12 are offset and shifted relative to each other. Correspondingly, a perpendicular projection of the inner end 10 of the flaring device 3 onto the piston axis 14 of the sliding device 4 lies between its inner end 15 and its end 16 oriented away from the tool device 1. Alternatively or preferably additionally, a perpendicular projection of the inner end 15 of the sliding device 4 onto the piston axis 9 of the flaring device 3 lies between the inner end 10 of the flaring device 3 and the end 11 oriented away from the tool device 1.

Figure 3:
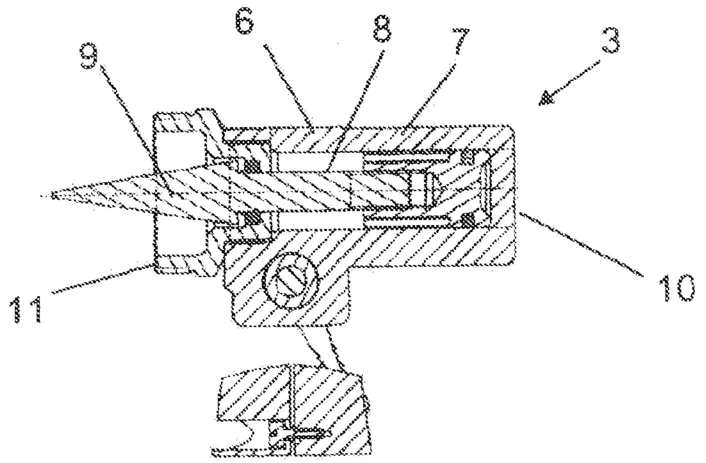
FIG. 3 is a sectional view of the tool device shown in FIG. 2 along the line A-A in FIG. 2, viewed in the direction of the arrow.

FIG. 3 is a sectional view of the tool device shown in FIG. 1 along the line A-A in FIG. 2, viewed in the direction of the arrow. The drawing shows the flaring device 3 with the first piston/cylinder unit 6. The working piston 8 of the piston/cylinder unit 6 in this case extends out from one end of the cylinder 7 and is embodied in the form of a flaring mandrel. A flaring head or expansion head (not shown) can be attached to the flaring device 3 by means of a connecting element 20. Such a flaring head is known, for example, from DE 20 2010 004 948 U1 whose disclosure content with regard to the design and function of slide elements is included herein by reference.

Figure 4:
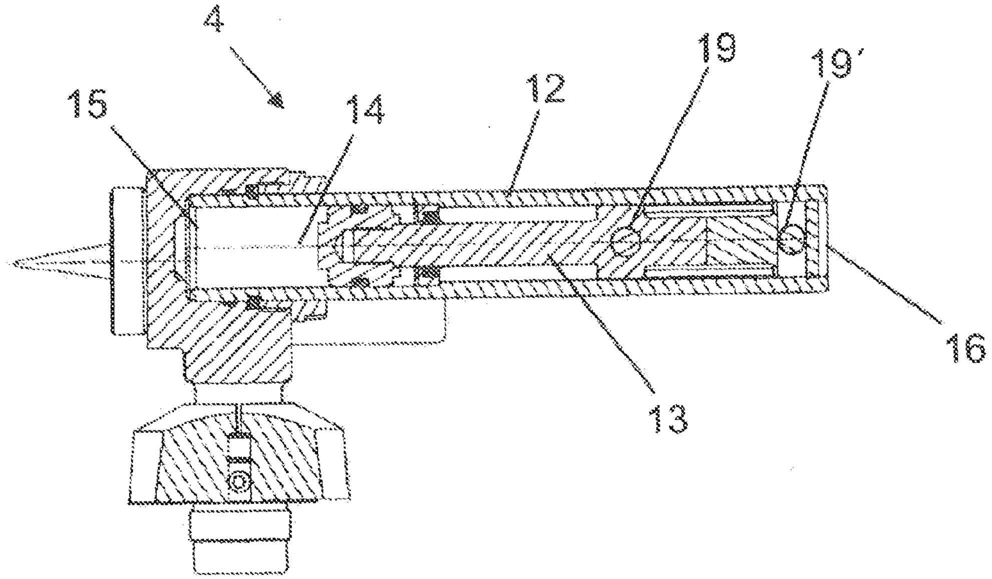
FIG. 4 is a sectional view of the tool device shown in FIG. 2 along the line B-B in FIG. 2, viewed in the direction of the arrow.

FIG. 4 is a sectional view of the tool device 1 according to the invention along the line B-B in FIG. 2, viewed in the direction of the arrow. The drawing shows the design of the sliding device 4 with the second piston/cylinder unit 12, in the corresponding position of the switch device 17, the drive piston 13 of the piston/cylinder unit 12 drives a moving slide element 18 in the direction toward another slide element. The slide elements are only indicated here by their fastening bolts 19, 19'; the working piston 13 slides the slide element 18 indicated by the fastening bolt 19 (FIG. 1) against the slide element indicated by the fastening bolt 19, which has a stable position during the pressing procedure. The movement of the slide element 18 against the other slide element causes a sliding sleeve to slide over a pipe end of a plastic pipe or composite metal/plastic pipe that has been flared by the flaring device 3, into which a fitting is inserted, producing a non-detachable connection. The inner diameter of the first piston/cylinder unit 6 differs from the diameter of the second piston/cylinder unit 12.

Figure 5:
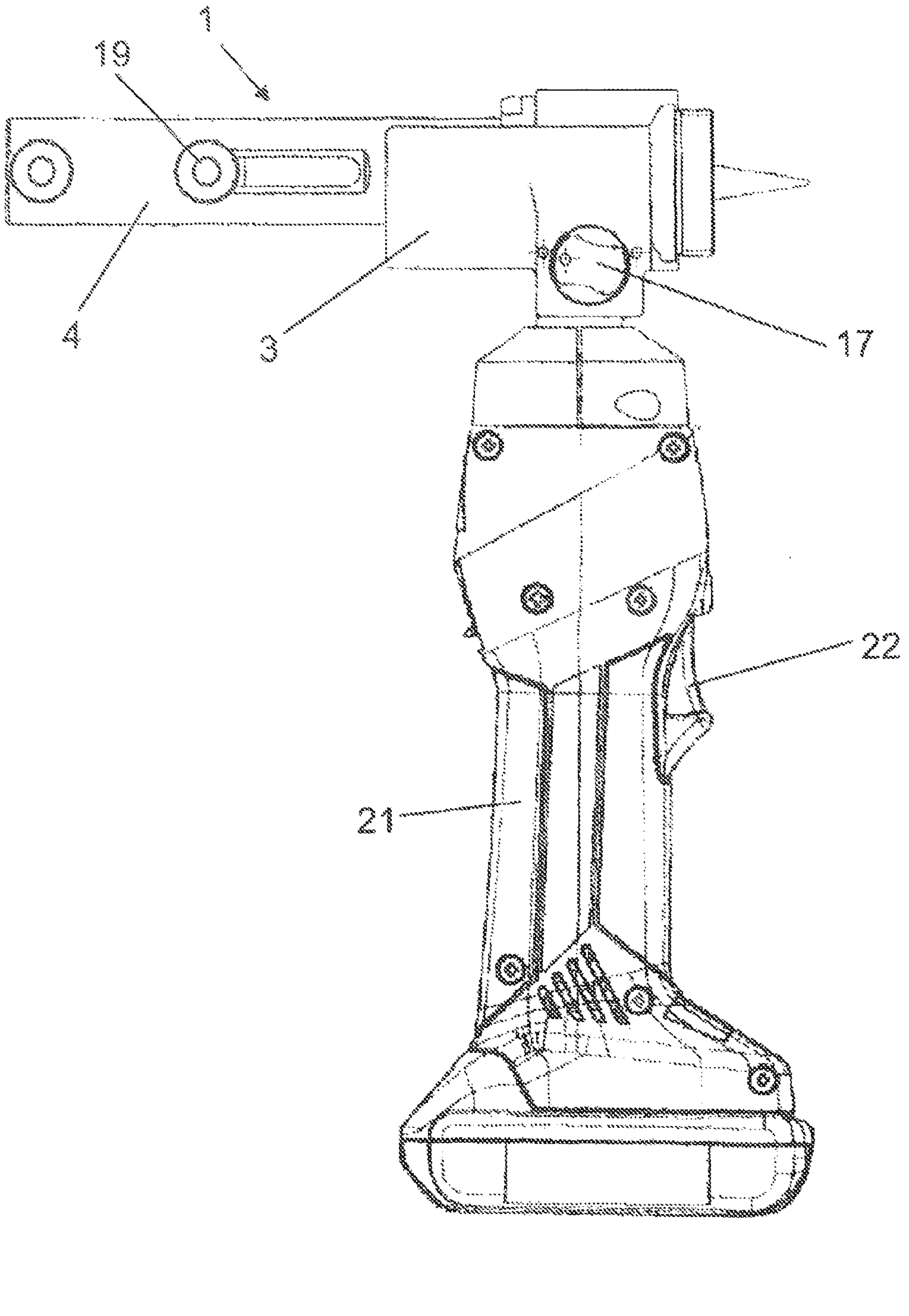
FIG. 5 is a side view in which the tool device shown in FIG. 1 is mounted on a drive unit with a hydraulic drive.

In a first position of the switch device 17, when a hydraulic pump contained in a hydraulic tool 21 (FIG. 5) is activated by means of a switch 22, the piston 8 of the flaring device 3 is advanced in the direction of the end 11 of the flaring device 3 oriented away from the tool device 1. The mandrel-shaped end of the piston 8 then penetrates into the expansion head, thus flaring the pipe end that has been slid onto the expansion head, In the other position of the switch device 17, the piston 13 is moved in the direction of the end 16 of the sliding device 4 oriented away from the tool device 1 according to the invention. As a result, a sliding sleeve, which has been slid in over the flared pipe end with the inserted fitting, is slid onto the pipe end with the inserted fitting, thus producing a non-detachable connection.

The invention claimed is:

1. A tool device for connecting a plastic pipe or composite metal/plastic pipe to a fitting by means of a sliding sleeve or compression sleeve, including:

a housing;

a flaring device for flaring the ends of the plastic pipe or composite metal/plastic pipe;

a sliding device for sliding the sliding sleeve on or a pressing device for pressing the compression sleeve on; and a mechanically operable drive element which can be switched to drive the flaring device or to drive the sliding device or pressing device, wherein the flaring device includes a first piston-cylinder unit, whose working piston has a piston axis and which has an inner end and an end oriented away from the tool device, and the sliding device or pressing device includes a second piston-cylinder unit, whose working piston has a second piston axis and which has an inner end and an end oriented away from the tool device; the piston axes extend parallel to each other and a perpendicular projection of the inner end of the flaring device onto the piston axis of the sliding device and or pressing device lies between the inner end of the sliding device or pressing device and the end oriented away from the tool device.

2. The tool device according to claim 1, wherein the two piston/cylinder units have different cylinder diameters.

3. The tool device according to claim 2, wherein the piston/cylinder unit of the flaring device has a smaller cylinder diameter than the piston/cylinder unit of the sliding device or pressing device.

4. A use of the tool device according to claim 1 for connecting a plastic pipe or composite metal/plastic pipe to a fitting, the use steps including the steps of:

(a) positioning the sliding sleeve or compressing sleeve and the fitting; and (b) activating the sliding sleeve or compression sleeve to connect the pipe to the fitting.

5. A use of the tool device according to claim 2 for connecting a plastic pipe or composite metal/plastic pipe to a fitting, the use steps including the steps of:

(a) positioning the sliding sleeve or compression sleeve and the fitting; and (b) activating the sliding sleeve or compression sleeve to connect the pipe to the fitting.

6. A tool device for connecting a plastic pipe or composite metal/plastic pipe to a fitting by means of sliding a sleeve or compression sleeve, including:

a housing;

a flaring device for flaring the ends of the plastic pipe or composite metal/plastic pipe;

a sliding device for sliding the sliding sleeve on or pressing device for pressing the compression sleeve on; and a mechanically operable drive element which can be switched to drive the flaring device or to drive the sliding device or pressing device, wherein the flaring device includes a first piston-cylinder unit, whose working piston has a piston axis and which has an inner end and an end oriented away from the tool device, and the sliding device or pressing device includes a second piston-cylinder unit, whose working piston has a second piston axis and which has an inner end and an end oriented away form the tool device; the piston axes extend parallel to each other and a perpendicular projection of the inner end of the sliding device or pressing device onto the piston axis of the flaring device lies between the inner end of the flaring device and the end oriented away from the tool device.

7. The tool device according to claim 6, wherein the two piston/cylinder units have different cylinder diameters.

8. The tool device according to claim 7, wherein the piston/cylinder unit of the flaring device has a smaller cylinder diameter than the piston/cylinder unit of the sliding device or pressing device.

9. A use of the tool device according to claim 6 for connecting a plastic pipe or composite metal/plastic pipe fitting, the use steps including steps of:

(a) positioning the sliding sleeve or compression sleeve and the fitting; and (b) activating the sliding sleeve or compression sleeve to connect the pipe to the fitting.

10. A use of the tool device according to claim 7 for connecting a plastic pipe or composite metal/plastic pipe to a fitting, the use steps including the steps of:

(a) positioning the sliding sleeve or compression sleeve and the fitting; and (b) activating the sliding sleeve or compression sleeve to connect the pipe to the fitting.

* * * * *